G. D. NEILL.
GAGE FOR SETTING COMPASSES.
APPLICATION FILED JUNE 21, 1918.

1,356,306.

Patented Oct. 19, 1920.

INVENTOR
Guy D. Neill
BY A. B. Bowman
ATTORNEY

UNITED STATES PATENT OFFICE.

GUY D. NEILL, OF BOSTONIA, CALIFORNIA.

GAGE FOR SETTING COMPASSES.

1,356,306.  Specification of Letters Patent.  Patented Oct. 19, 1920.

Application filed June 21, 1918. Serial No. 241,255.

*To all whom it may concern:*

Be it known that I, GUY D. NEILL, a citizen of the United States, residing at Bostonia, in the county of San Diego and State of California, have invented certain new and useful Improvements in Gages for Setting Compasses, of which the following is a specification.

My invention relates to a gage adapted to facilitate the setting of compasses, dividers and the like, usually used for dividing circles and segments of circles into an equal number of spaces, and the objects of my invention are: first, to provide a gage of this class by the use of which a compasses may be readily and accurately set for dividing a circle or a segment of a circle into an equal number of parts instead of having to make several trials and resetting the compasses before having it properly set as is ordinarly done: second, to provide a gage of this class in which equal divisions of a great variety of circles or segments may be readily determined: and third, to provide a gage of this class which is very simple and economical of construction, durable, easy to operate, and which will not readily deteriorate or get out of order.

Figure 1:
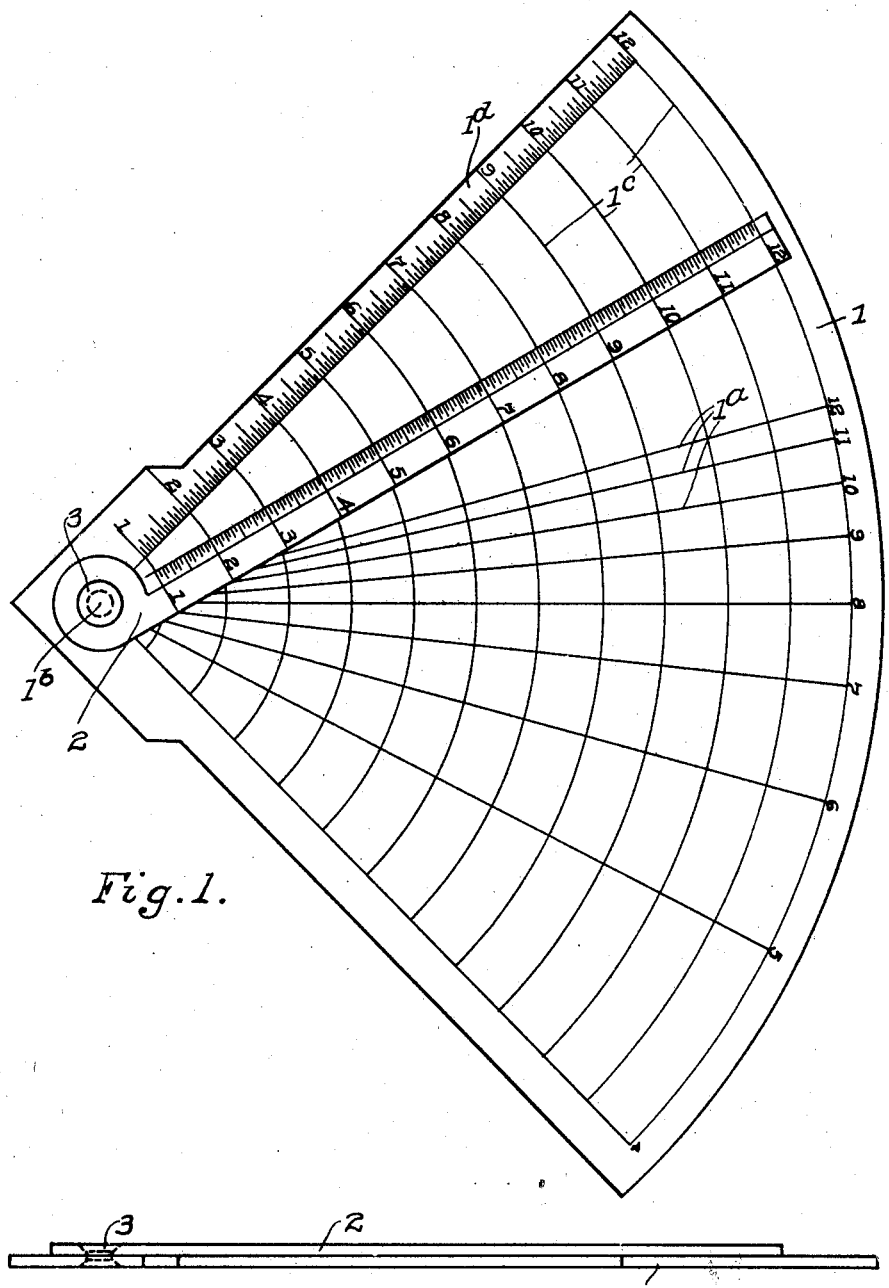
Figure 2:
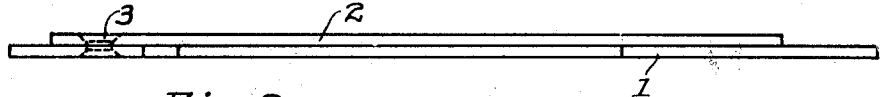

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this specification in which:

Figure 1 is a top or plan view of my gage and Fig. 2 is an edge view thereof.

Similar characters of reference refer to similar parts and portions in the different views of the drawings.

My gage consists of a plate 1 composed of any desired material and it is preferably a quadrant in form as shown. It is provided with a plurality of lines $1^a$ thereon radiating from a common center $1^b$ and with a plurality of segments of circles $1^c$ concentric with said common center $1^b$.

Along one edge of the plate 1 is provided a graduated scale $1^d$ with reference numerals indicating the diameter of the circle, that the lines $1^c$ are described and the lines $1^a$ are spaced a certain distance from the inner edge of the scale $1^d$ for dividing the circle indicated by the scale into an equal number of spaces and these lines each have reference numerals indicating the number of such divisions. On this plate 1 is pivotally mounted another graduated scale 2 preferably by means of a rivet 3 at the point $1^b$ and said scale is provided with numerals and graduations conforming to the numerals and graduations of the scale $1^b$. The one edge of this scale 2 which faces the scale $1^d$ is in line with the center $1^b$ so that this scale 2 may be moved to any position desired on the plate 1 to be determined by the lines $1^a$ and the compasses set by placing the one point in the proper position on the scale $1^d$ and the other point in a conforming position on the scale 2, and the space required for an equal division of the circle readily determined. The front edge of the scale 2 may be beveled so that the scale therein would be closer to the plate 1.

Though I have shown and described a particular construction, combination, and arrangement of parts and portions, I do not wish to be limited to this particular construction, combination and arrangement, but desire to include in the purview of my invention the construction, combination, and arrangement substantially as set forth in the appended claims.

It is obvious that with this construction there is provided a gage in which the division of a circle into any number of segments may be readily determined without first dividing it with a compasses or divider.

Having thus described my invention what I claim as new and desire to secure by Letters Patent, is:

A compasses setting gage, including a plate member having a straight edge provided with a scale, a plurality of equally spaced concentric lines extending from the main division lines of said scale and having their center at the starting point of said scale, a plurality of unequally spaced lines provided with reference characters, radiating from said center for dividing said concentric lines in certain predetermined spacings from said scale, and a straight edge scale member pivoted concentrically with said concentric lines and graduated similarly to the scale on the edge of said plate.

In testimony whereof, I have hereunto set my hand at San Diego, California, this 11 day of June 1918.

GUY D. NEILL.